US012719392B2

(12) United States Patent
Wu et al.

(10) Patent No.: US 12,719,392 B2
(45) **Date of Patent: *Aug. 25, 2026**

(54) MOTOR ANGULAR POSITION CONTROL

(71) Applicant: Schlumberger Technology Corporation, Sugar Land, TX (US)

(72) Inventors: Jian Wu, Houston, TX (US); Ramakrishna Madhireddy, Cypress, TX (US); Nathaniel Wicks, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/915,620

(22) Filed: Oct. 15, 2024

(65) Prior Publication Data

US 2025/0274064 A1 Aug. 28, 2025

Related U.S. Application Data

(60) Continuation of application No. 18/430,178, filed on Feb. 1, 2024, now Pat. No. 12,119,775, which is a (Continued)

(51) Int. Cl.

| | |
|---|---|
| ***H02P 6/08*** | (2016.01) |
| ***E21B 7/06*** | (2006.01) |
| ***F02D 25/02*** | (2006.01) |
| ***H02P 6/15*** | (2016.01) |
| ***H02P 6/18*** | (2016.01) |
| *E21B 3/02* | (2006.01) |

(52) U.S. Cl.

CPC ................ *H02P 6/18* (2013.01); *E21B 7/068* (2013.01); *F02D 25/02* (2013.01); *E21B 3/022* (2020.05)

(58) Field of Classification Search

CPC ...... H02P 6/08; H02P 6/18; H02P 6/15; F02D 25/02; E21B 44/00; E21B 7/068; E21B 3/022

USPC .......................................... 318/721; 324/346

See application file for complete search history.

(56) References Cited

U.S. PATENT DOCUMENTS

| | | | |
|---|---|---|---|
| 1,020,837 | A | 3/1912 | Morgan |
| 5,258,755 | A | 11/1993 | Kuckes |

(Continued)

FOREIGN PATENT DOCUMENTS

| | | | |
|---|---|---|---|
| WO | 2019050824 | A1 | 3/2019 |
| WO | 2019066930 | A1 | 4/2019 |

(Continued)

*Primary Examiner* — Gabriel Agared

(74) *Attorney, Agent, or Firm* — Jeffrey D. Frantz

(57) ABSTRACT

A motor controller to control rotational speed of an output shaft of an electric motor. The motor controller includes a proportional controller and a time-optimal controller. The proportional controller controls the rotational speed when a present rotational position of the shaft is between a target rotational position and a switching point, inclusively. The time-optimal controller controls the rotational speed when the present rotational position is not between the target rotational position and the switching point. Also introduced herein are aspects pertaining to determining the switching point in a manner that minimizes overshooting the target rotational position while maximizing expediency at which the target rotational position is reached.

11 Claims, 9 Drawing Sheets

Related U.S. Application Data division of application No. 16/807,918, filed on Mar. 3, 2020, now Pat. No. 11,916,507.

(56) References Cited

U.S. PATENT DOCUMENTS 5,550,483 A 8/1996 Boyette, Jr.
5,789,885 A * 8/1998 Seel .................. B23Q 11/0092 318/123
6,050,348 A 4/2000 Richarson
6,166,654 A 12/2000 van den Steen
6,327,539 B1 12/2001 Keultjes
6,338,390 B1 1/2002 Tibbitts
6,802,378 B2 10/2004 Haci
6,918,453 B2 7/2005 Haci
7,096,979 B2 8/2006 Haci
7,100,708 B2 9/2006 Koederitz
7,152,696 B2 12/2006 Jones
7,404,454 B2 7/2008 Hulick
7,422,076 B2 9/2008 Koederitz
7,461,705 B2 12/2008 Hulick
7,548,039 B2 * 6/2009 Oomura ................ G05B 19/19 318/788
7,588,100 B2 9/2009 Hamilton
7,802,634 B2 9/2010 Boone
7,810,584 B2 10/2010 Haci
7,823,655 B2 11/2010 Boone
7,915,845 B2 * 3/2011 Tang ........................ H02P 6/16 318/599
8,360,171 B2 1/2013 Boone
8,387,720 B1 3/2013 Keast
8,528,663 B2 9/2013 Boone
8,602,126 B2 12/2013 Boone
8,672,055 B2 3/2014 Boone
8,689,906 B2 4/2014 Nessjoen
RE44,956 E 6/2014 Richardson
RE44,973 E 7/2014 Richardson
8,939,233 B2 1/2015 Edbury
8,939,234 B2 1/2015 Mebane, III
8,950,512 B2 2/2015 Nessjoen
9,145,768 B2 9/2015 Normore
9,181,792 B2 11/2015 Pena
9,249,655 B1 2/2016 Keast
9,290,995 B2 3/2016 Boone
9,309,760 B2 4/2016 Haci
9,359,881 B2 6/2016 DiSantis
9,404,307 B2 8/2016 Maidla
9,424,667 B2 8/2016 Pena
9,506,336 B2 11/2016 Orbell
9,581,008 B2 2/2017 Kyllingstad
9,593,567 B2 3/2017 Pink
9,598,904 B2 3/2017 Aldred
9,650,880 B2 5/2017 Bowley
9,689,250 B2 6/2017 Badkoubeh
9,784,035 B2 10/2017 Boone
9,885,231 B2 2/2018 Nessjoen
9,920,612 B2 3/2018 Dwars
9,932,811 B2 4/2018 Dwars
9,952,119 B2 4/2018 Simanjuntak
10,036,678 B2 7/2018 Fisher, Jr.
10,053,971 B2 8/2018 Lai
10,125,598 B2 11/2018 Dykstra
10,138,723 B2 11/2018 Pettapiece
10,208,580 B2 2/2019 Benson
10,233,740 B2 3/2019 Patterson
10,260,331 B2 4/2019 Viens
10,275,715 B2 4/2019 Laing
10,301,877 B2 5/2019 Schaaf
10,378,282 B2 8/2019 Hadi
10,415,363 B2 9/2019 Mauldin
10,415,368 B2 9/2019 Pettapiece
10,472,944 B2 11/2019 Wassell
10,487,642 B2 11/2019 Haci
10,533,409 B2 1/2020 Benson
10,612,367 B2 4/2020 Orban
10,612,989 B2 4/2020 Jeffryes
10,689,967 B2 6/2020 Jeffryes
2003/0222617 A1 12/2003 Nakai
2004/0008002 A1 1/2004 Kamio
2004/0066166 A1 4/2004 Nakai
2006/0125439 A1 6/2006 Ajima
2008/0134727 A1 6/2008 May
2009/0128139 A1 5/2009 Drenth
2009/0322262 A1* 12/2009 Tobari ..................... H02P 21/18 318/400.02
2010/0188032 A1* 7/2010 Takai ........................ H02P 6/06 318/400.21
2011/0025243 A1* 2/2011 Lin ......................... H02P 25/03 318/400.11
2014/0157610 A1 6/2014 Garvey
2014/0196949 A1 7/2014 Hareland
2014/0354199 A1 12/2014 Zeng
2015/0180387 A1* 6/2015 Yoo .......................... H02P 6/10 318/400.02
2016/0047219 A1 2/2016 Jeffryes
2016/0149523 A1* 5/2016 Yoshiura ................ H02P 23/18 318/432
2017/0101861 A1 4/2017 Kyllingstad
2018/0013370 A1* 1/2018 Lee .......................... H02P 6/18
2018/0128093 A1 5/2018 Jeffryes
2018/0149010 A1 5/2018 Zheng
2018/0149012 A1 5/2018 Dwars
2018/0274352 A1 9/2018 Orban
2018/0283157 A1 10/2018 Hadi
2018/0334898 A1 11/2018 Zha
2018/0363392 A1 12/2018 Brandsvoll
2019/0032466 A1 1/2019 Wilson
2019/0048706 A1 2/2019 Benson
2019/0049323 A1 2/2019 Martin
2019/0106976 A1 4/2019 Badgwell
2019/0106979 A1 4/2019 Hadi
2019/0120039 A1 4/2019 Gillan
2019/0120040 A1 4/2019 Zhao
2019/0145240 A1 5/2019 Benson
2019/0187012 A1 6/2019 Wu
2019/0195357 A1 6/2019 Kamio
2019/0234208 A1 8/2019 Orban
2020/0003046 A1 1/2020 Zheng
2020/0136537 A1 4/2020 Karasawa
2020/0378237 A1 12/2020 Wicks
2021/0011048 A1 1/2021 Wu
2021/0277768 A1 9/2021 Wu
2024/0178773 A1 5/2024 Wu

FOREIGN PATENT DOCUMENTS

WO 2019074623 A1 4/2019
WO 2019165334 A1 8/2019
WO 2019232516 A1 12/2019

* cited by examiner

MOTOR ANGULAR POSITION CONTROL

RELATED APPLICATIONS

This application is a continuation of U.S. patent application Ser. No. 18/430,178, now U.S. Pat. No. 12,119,775, filed on Feb. 1, 2024, which is a divisional of U.S. patent application Ser. No. 16/807,918, now U.S. Pat. No. 11,916,507, filed on Mar. 3, 2020. These applications are incorporated herein by reference in their entirety.

BACKGROUND OF THE DISCLOSURE

Some motor position control applications mandate that overshooting of target angular positions be kept to a minimum, if not entirely prevented. For example, when a top drive is utilized to rotate a drill string to steer toolface, operations may mandate that the target angular position is reached exactly with no overshoot. In another example, when a top drive is utilized to oscillate a drill string between specified angular position targets, operations may mandate that the targets are not overshot, so that the toolface is not unintentionally changed. In these examples (among others within the scope of the present disclosure), operational procedures may include an intended accuracy of the stop positions of the motor shaft, such that the stop position error falls within specified, generally small, position dead bands. However, operational efficiency and other factors are affected by the expediency and smoothness at which the target angular positions are reached. Moreover, the above aspects may also be affected by system-specified limits on motor acceleration, deceleration, and/or velocity.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including causing operation of a motor controller operable to control rotational speed of an output shaft of an electric motor. The motor controller includes a proportional controller and a time-optimal controller. The proportional controller controls the rotational speed when a present rotational position of the shaft is between a target rotational position and a switching point, inclusively. The time-optimal controller controls the rotational speed when the present rotational position is not between the target rotational position and the switching point.

The present disclosure also introduces a method including determining a switching point to be used by a motor controller that is operable to control rotational speed of an output shaft of an electric motor. The motor controller includes a proportional controller and a time-optimal controller. The proportional controller controls the rotational speed when a present rotational position of the shaft is between a target rotational position and the switching point, inclusively. The time-optimal controller controls the rotational speed when the present rotational position is not between the target rotational position and the switching point. Determining the switching point includes determining which one of N curves corresponds to a predetermined system communications delay, N being a positive integer, and each of the N curves relating a counter delay factor β to candidate switching points. Determining the switching point also includes selecting the switching point based on a smallest one of the candidate switching points that results in a value of the counter delay factor being less than one for the determined one of the N curves.

The present disclosure also introduces an apparatus including an electric motor that comprises an output shaft and a motor controller operable to control rotational speed of the output shaft. The motor controller includes a proportional controller that controls the rotational speed when a present rotational position of the shaft is between a target rotational position and a switching point, inclusively. The motor controller also includes a time-optimal controller that controls the rotational speed when the present rotational position is not between the target rotational position and the switching point.

The present disclosure also introduces an apparatus including a processing system that includes a processor and a memory storing code executable by the processor to determine a switching point to be used by a motor controller that is operable to control rotational speed of an output shaft of an electric motor. The motor controller includes a proportional controller and a time-optimal controller. The proportional controller controls the rotational speed when a present rotational position of the shaft is between a target rotational position and the switching point, inclusively. The time-optimal controller controls the rotational speed when the present rotational position is not between the target rotational position and the switching point. The processing system determines the switching point by determining which one of N curves corresponds to a predetermined system communications delay, N being a positive integer, and each of the N curves relating a counter delay factor β to candidate switching points, and selecting the switching point based on a smallest one of the candidate switching points that results in a value of the counter delay factor being less than one for the determined one of the N curves.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
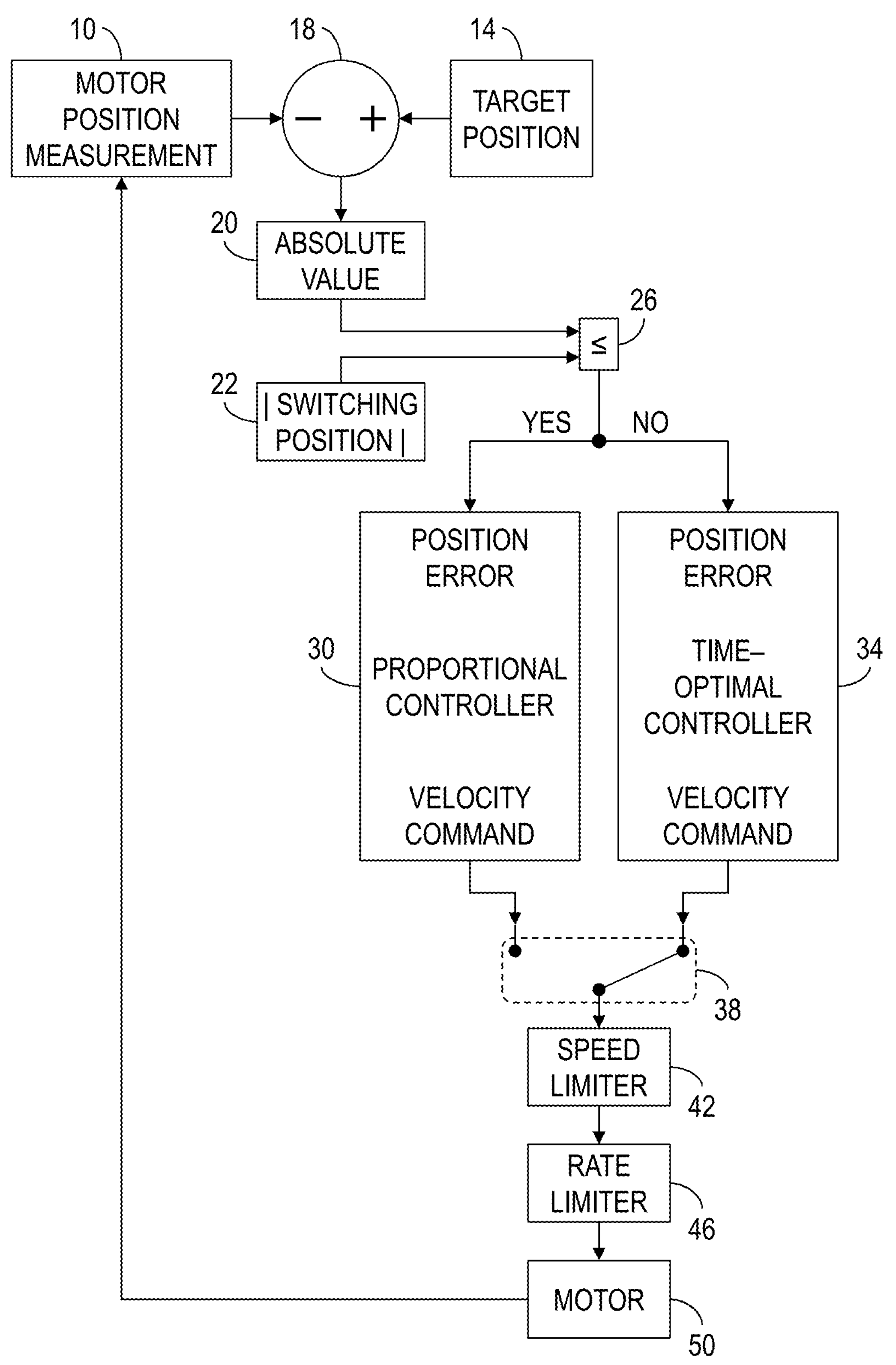
FIG. 1 is a flow-chart diagram of at least a portion of an example implementation of a method according to one or more aspects of the present disclosure.
Figure 2:
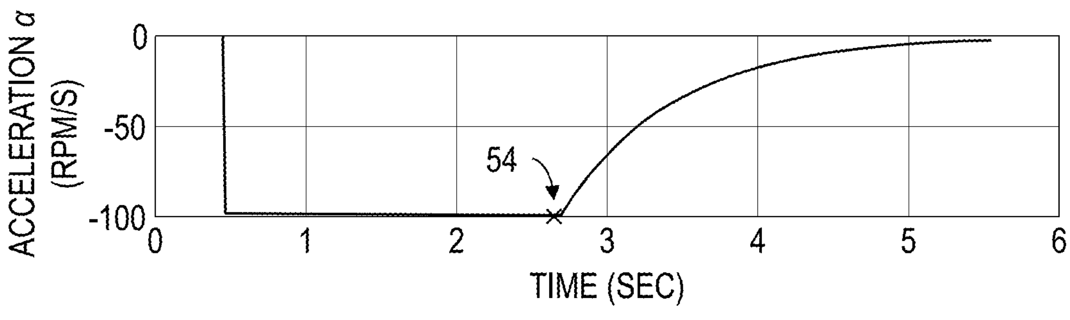
FIGS. 2-5 are graphs depicting an example simulation according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the description of a first feature in contact with a second feature in the description that follows may include implementations in which the first and second features are in direct contact, and may also include implementations in which additional features may interpose the first and second features, such that the first and second features may not be in direct contact.

The present disclosure introduces aspects pertaining to controlling the angular position of a motor output shaft in a manner that minimizes or eliminates overshooting target angular positions. Such aspects may be utilized to achieve desiderated accuracies of the motor stop positions while maximizing motor speed and smoothness, yet still within system-specified limits on motor acceleration, deceleration, and/or velocity. The motor control is accomplished via a switching position control scheme in which motor control is switched between a proportional (e.g., linearly proportional) controller and a time-optimal controller.

That is, up to a given point near the target position, the proportional controller generates decreasing velocity and/or acceleration (i.e., deceleration) commands as the target position is approached. Beyond that given point, the time-optimal controller generates position-based velocity commands employing maximum system-allowed acceleration and deceleration rates. Thus, the time-optimal controller permits running the motor at the maximum velocity that the system permits as long as possible before decelerating using the maximum deceleration rate. Gain values for the controllers are determined using given deceleration rates and switching points/positions in such a way that velocity commands from the proportional controller and the time-optimal controller are equal at the moment control is switched between the controllers, thus permitting a smooth transition when switching between the controllers.

The point at which the motor control is switched from the proportional controller to the time-optimal controller is referred to herein as the switching point or switching position. The switching point determines the value of the linear proportional position gain. A small gain leads to a smooth motion toward the target but may cause excessive time to reach the target. Moreover, the switching position control scheme introduced herein utilizes the proportional control phase to manage system delay, which can be ever-present. The proportional control gain may permit a smooth and exponentially decreasing velocity profile where, near the target, the final values may be so small that the impacts of delay may be counteracted.

For the sake of simplicity, the angular position of the motor shaft may be referred to herein as the motor position (in units of cycles or revolutions (revs)), the angular velocity of the motor shaft may be referred to as the motor speed (w, in units of revs per second (rps) or revs per minute (rpm)), the angular acceleration/deceleration of the motor shaft may be referred to as the motor acceleration/deceleration (a, in units of revs per second per second (rev/s$^2$) or rpm/second), and the angular displacement of the motor shaft may be referred to as the motor displacement ($\Delta\theta$, in units of cycles or revs). In addition, the following description is initially presented in a context that assumes that angular positions and velocities are both positive in a forward rotating direction. Reverse directions are subsequently addressed further below.

The motor speed at the switching point may be determined as set forth below in Equation (1).

$$\omega_0 = \kappa\theta_0 \tag{1}$$

where $\omega_0$ is the motor speed at the switching point, k is the motor position control proportional gain (in units of 1/s, where s is time in seconds), and $\theta_0$ is the motor position at the switching point that is related to the target position. The motor position $\theta_0$ may be considered a position error between the switching position and the target position. For forward rotation, the motor position $\theta_0$ is a positive number. For the sake of simplicity and without loss of generality in the following description, the target position is considered to be 0, and the position error $\theta$ (or $\theta_n$) may be used as position that represents the motor position or angular displacement relative to the target position at 0, whereby $\theta$ would be positive numbers and decreasing during forward rotation of the motor.

The displacement made by $\omega_0$ may be determined as set forth below in Equation (2).

$$\Delta\theta_1 = \kappa\theta_0 t_s \tag{2}$$

where $\Delta\theta_1$ is the motor displacement at a first time and $t_s$ is the time interval of the time period elapsed at the first time.

The new motor position $\theta_1$ may then be determined as set forth below in Equation (3).

$$\theta_1 = \theta_0 - \Delta\theta_1 = \theta_0(1 - \kappa t_s) \tag{3}$$

As described above, prior to the switching point, the same deceleration rate for position control $\alpha_d$ (a negative value) would apply. Therefore, the speed $\omega_1$ at the first time after the switching point may be determined in two ways, as set forth below in Equations (4) and (5).

$$\omega_1 = \omega_0 + \alpha_d t_s = \kappa\theta_0 + \alpha_d t_s \tag{4}$$

$$\omega_1 = \kappa\theta_1 = \kappa\theta_0 - \kappa^2\theta_0 t_s \tag{5}$$

Equations (4) and (5) may then be utilized to obtain Equations (6) and (7) set forth below.

$$a_d t_s = -\kappa^2\theta_0 t_s \tag{6}$$

-continued $$\kappa = \sqrt{\frac{-\alpha_d}{\theta_0}} \tag{7}$$

The motor speed at the switching point may then be determined by combining Equations (1) and (7), as set forth below in Equation (8).

$$\omega_0 = \kappa\theta_0 = \sqrt{-\alpha_d\theta_0} \tag{8}$$

For the speed generated in the time-optimal control phase, the motion leads to decelerating to $\omega_0$ at $\theta_0$ for a given $\theta_0$ and $\alpha_d$. For example, regarding a constantly decelerating rotation, starting at $\omega_i$ and finishing at of and going through an angular displacement of $\Delta\theta$, the motion may be described as set forth below in Equations (9) and (10).

$$\omega_f = \omega_i + \alpha_d t \tag{9}$$

$$\Delta\theta = \omega_i t + \frac{1}{2}\alpha_d t^2 \tag{10}$$

Equation (9) can be rearranged as set forth below in Equation (11).

$$t = \frac{\omega_f - \omega_i}{\alpha_d} \tag{11}$$

Equation (12) set forth below can then be obtained based on Equations (10) and (11).

$$\omega_f^2 = \omega_i^2 + 2\alpha_d\Delta\theta \tag{12}$$

This motion takes place prior to the switching point. Thus, if given the current position (error) at $\theta$ and the switching point at $\theta_0$, then $\Delta\theta$ may be as set forth below in Equation (13).

$$\Delta\theta = \theta - \theta_0 \tag{13}$$

Accordingly, taking $\omega_0$ as of and combining Equations (8), (12) and (13), the speed $\omega$ at the current position $\theta$ may be determined as set forth below in Equation (14).

$$\omega = \sqrt{|-\alpha_d\theta_0| - 2\alpha_d(\theta - \theta_0)} \tag{14}$$

The velocity command can be generalized for rotation in both directions. When position error (position) is positive, the motor rotates in the forward direction, and when negative, the motor rotates in the reverse direction. Thus, Equation (14) can be generalized as set forth below in Equation (15).

$$\omega = \frac{\theta}{|\theta|}\sqrt{|\alpha_d\theta_0| + |2\alpha_d(|\theta| - |\theta_0|)|} \tag{15}$$

Thus, speed in the proportional control phase may be as set forth below in Equation (16).

$$\omega = \theta\sqrt{\frac{|\alpha_d|}{|\theta_0|}} \tag{16}$$

In either of the proportional and time-optimal control phases, the velocity command generated as set forth above in Equation (15) or (16) satisfies the acceleration and deceleration rate limits defined by the application and the general motor rate limits, where the acceleration and deceleration rate limits defined by the application are no larger than the general motor rate limits. At the same time, the speed does not exceed the designed speed limits. If the absolute value of the current position (error) is smaller than the absolute value of the given switching position, the proportional controller works alone.

FIG. 1 is a schematic view of at least a portion of an example implementation of the switching control scheme described above. A current motor position measurement 10 is subtracted from a target position 14 by a subtractor 18. The current motor position measurement 10 may be obtained from a position encoder and/or other measurement sensor disposed on or otherwise associated with the motor 50 being controlled. The target position 14 may be obtained from a human-machine interface (HMI) and/or other portion of a processing system (or device) implementing the motor controller operable to control the motor 50 via the switching control scheme introduced herein. The subtractor 18 may be implemented by hardware and/or software of the processing system, and the output may be referred to as the position error.

The absolute value 20 of the position error is then compared to the absolute value of the switching position 22, such as by a comparator 26, to determine whether the motor 50 will be controlled by a proportional controller 30 or a time-optimal controller 34 as described above. The switching position 22 may be obtained from the HMI and/or determined by the processing system, such as according to one or more aspects described below. The comparator 26 may be implemented by hardware and/or software of the processing system. If the absolute value 20 of the position error output by the subtractor 18 is determined by the comparator 26 to be less than or equal to the switching position 22, then velocity commands output by the proportional controller 30 control the motor 50, otherwise velocity commands output by the time-optimal controller 34 control the motor 50. The switching between the proportional controller 30 and the time-optimal controller 34 is schematically depicted in FIG. 1 by a switch 38.

The velocity commands output by the proportional controller 30 and the time-optimal controller 34 may be altered prior to being applied to the motor 50. For example, a speed limiter 42 may decrease or otherwise alter the velocity commands to ensure that the velocity commands do not exceed a maximum operating speed of the motor 50, such as may be specified by the manufacturer of the motor 50 and/or requirements of the system comprising the motor 50. Similarly, a rate limiter 46 may alter the velocity commands to ensure that the velocity commands do not violate maximum acceleration/deceleration limits of the motor 50.

Figure 3:
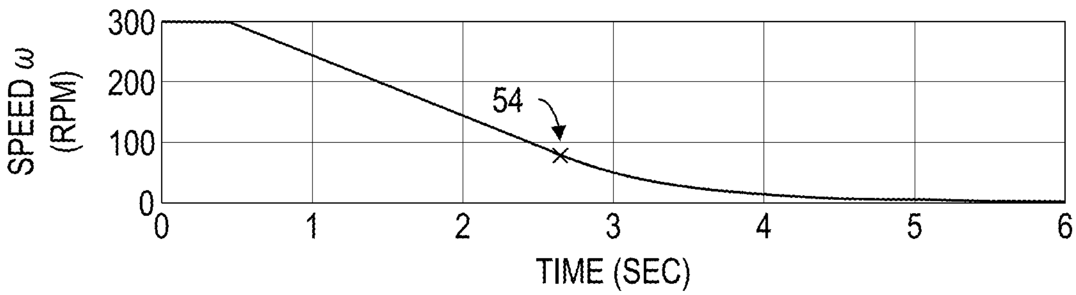
Figure 4:
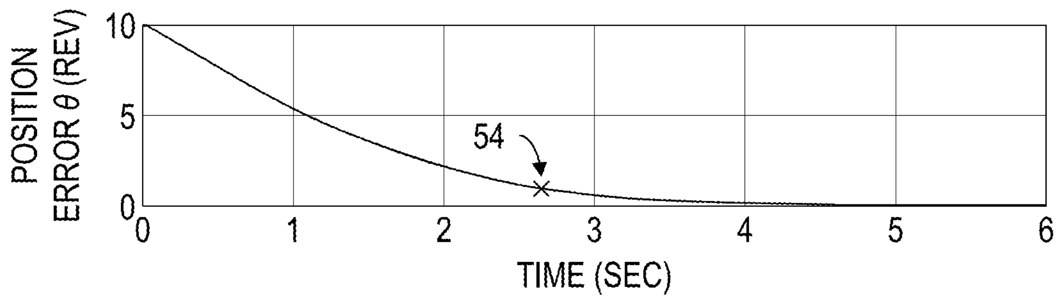
Figure 5:
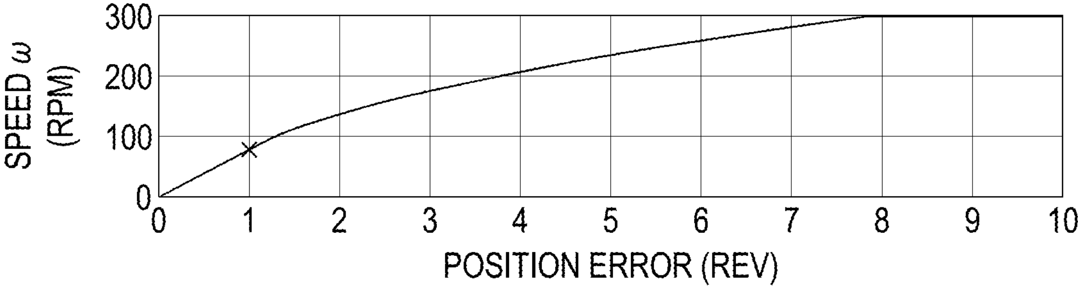

FIGS. 2-5 are graphs depicting aspects of an example simulation related to the control method shown in FIG. 1. In the example simulation, the motor initially rotates at a maximum speed (i.e., as shown in FIG. 3, 300 rpm) and is at position of 10 revs away from a target position (i.e., as shown in FIG. 4, position error is 10 revs). The switching position (shown by the "x" symbol) 54 is set at 1.0 rev and the deceleration rate is −100 rpm/s or −1.667 rev/$s^2$. Before the switching position 54, the speed is 300 rpm (maximum speed) until about 0.5 sec, when the velocity determined utilizing Equation (15) becomes lower than the maximum speed. The speed then decreases with maximum deceleration rate. Thus, it achieves the time-optimal performance. After the switching point 54, the speed and deceleration rate simultaneously and exponentially lower to zero at about 5.5 seconds. The speed profile (FIG. 3) shows smooth continuation during the process, and the target position (FIG. 4) is reached without overshoot. This example depicts an ideal case assuming there is no communication delay, with the speed present value (Pv) closely tracking the speed setpoint (Sp).

The present disclosure also introduces a systematic approach to determining the switching point position. That is, dynamic control systems encounter communication delays. Motor control systems are no exception, even though the delays have been significantly lowered to milli-sec levels with current advanced industrial communication device and protocols. Thus, to achieve zero or minimal position error, impacts from system delay may be counteracted via aspects introduced herein. For example, when the current motor position nears the target position, a zero-speed command would ideally be issued by the motor controller(s). However, due to communication delay, the motor is still being commanded by a previous non-zero speed command, resulting in overshooting the target position. An approach to managing this is to utilize a (larger) switching point to counter the effect of the communication delay. However, an excessively large switching point slows reaching the target, thus lowering efficiency and effectiveness of the switching motor control scheme introduced herein. Thus, the following description presents a systematic approach to determining a switching point that minimizes or eliminates overshot while maximizing the expediency at which the target position at zero is reached.

The exponential relationship between the speeds in adjacent time periods in the proportional control phase may be determined based on Equations (17)-(19) set forth below.

$$\omega_0 = \kappa\theta_0 \tag{17}$$

$$\omega_1 = \kappa\theta_1 = \kappa(\theta_0 - \kappa\theta_0 t_s) = \kappa\theta_0(1 - \kappa t_s) \tag{18}$$

$$\omega_2 = \kappa\theta_2 = \kappa(\theta_1 - \kappa\theta_1 t_s) = \kappa((\theta_0 - \kappa\theta_0 t_s) - \kappa\theta_0(1 - \kappa t_s)t_s) = \kappa\theta_0(1 - \kappa t_s)^2 \tag{19}$$

It can be observed from Equations (17)-(19) that a speed on in each of n time periods is slowed to a percentage (i.e., $1-\kappa t_s$) of the speed $\omega_{n-1}$ in the previous time period, as expressed in Equation (20) set forth below.

$$\omega_n = (1 - \kappa t_s)\omega_{n-1} \tag{20}$$

The impact of delay on κ can then be determined. The delay impacts the speed at which the switching point (as derived in Equation (8) or (16)) will be reached after the prespecified switching point position. Thus, the delay leads to a shorter switching position and, therefore, a larger proportional gain κ. The determination of the switching point may assume that the delay is known as N (a positive integer) sampling time periods ($t_s$), and that the speeds prior to reaching the switching speed follow the deceleration of $\alpha_d$ while the actual calculated switching point $\Delta\theta^*$ is larger than zero. This leads to Equations (21) and (22) set forth below.

$$\omega_{-N+1} = \omega_0 + |\alpha_d|(N - 1)t_s \tag{21}$$

$$\Delta\theta^* = \frac{1}{2|\alpha_d|}\left(\omega_{-N+1}{}^2 - \omega_0{}^2\right) \tag{22}$$

Actual proportional gain $\kappa^*$ can then be estimated based on the same switching speed (delayed), as set forth below in Equation (23).

$$\kappa^* = \frac{\kappa\theta_0}{\theta_0 - \Delta\theta^*} \tag{23}$$

After the actual proportional gain is estimated, the switching point can be systematically determined, given that the deceleration rate and system delays are known. For example, at the $n^{th}$ time period, the actual motor position is ε, a position error within which the speed would be set to zero. Based on Equations (20) and (23), the speeds between n and n-N time periods can be established as set forth below in Equation (24).

$$\omega_n = \kappa^*\varepsilon,\ \omega_{n-1} = \frac{\omega_n}{(1 - \kappa^* t_s)},\ \ldots\ ,\ \omega_{n-N} = \frac{\omega_n}{(1 - \kappa^* t_s)^N} \tag{24}$$

To eliminate overshoot, the sum of displacement caused by each of the speeds from Equation (24) excluding $\omega_n$ is less than ε, as set forth below in Equation (25).

$$\kappa^*\varepsilon\left(\frac{1}{(1 - \kappa^* t_s)} + \ldots\ \frac{1}{(1 - \kappa^* t_s)^N}\right)t_s < \varepsilon \tag{25}$$

A counter delay factor β may be defined as set forth below in Equation (26).

$$\beta = \kappa^*\left(\frac{1}{(1 - \kappa^* t_s)} + \ldots\ \frac{1}{(1 - \kappa^* t_s)^N}\right)t_s < 1 \tag{26}$$

The terms in parenthesis in Equation (26) share the common ratio of $(1-\kappa^* t_s)-1$. Thus, Equation (26) can be simplified as set forth below in Equation (27).

$$\beta = \left(\kappa^* t_s/(1 - \kappa^* t_s)\right)\frac{1 - (1 - \kappa^* t_s)^{-N}}{1 - (1 - \kappa^* t_s)^{-1}} < 1 \tag{27}$$

It would be difficult, if possible, to obtain an analytic solution for $\kappa^*$ using Equation (27) and, eventually, a subsequent solution for $\theta_0$. Thus, the following description presents a practical approach to achieving an approximate solution for $\kappa^*$ and $\theta_0$.

Figure 6:
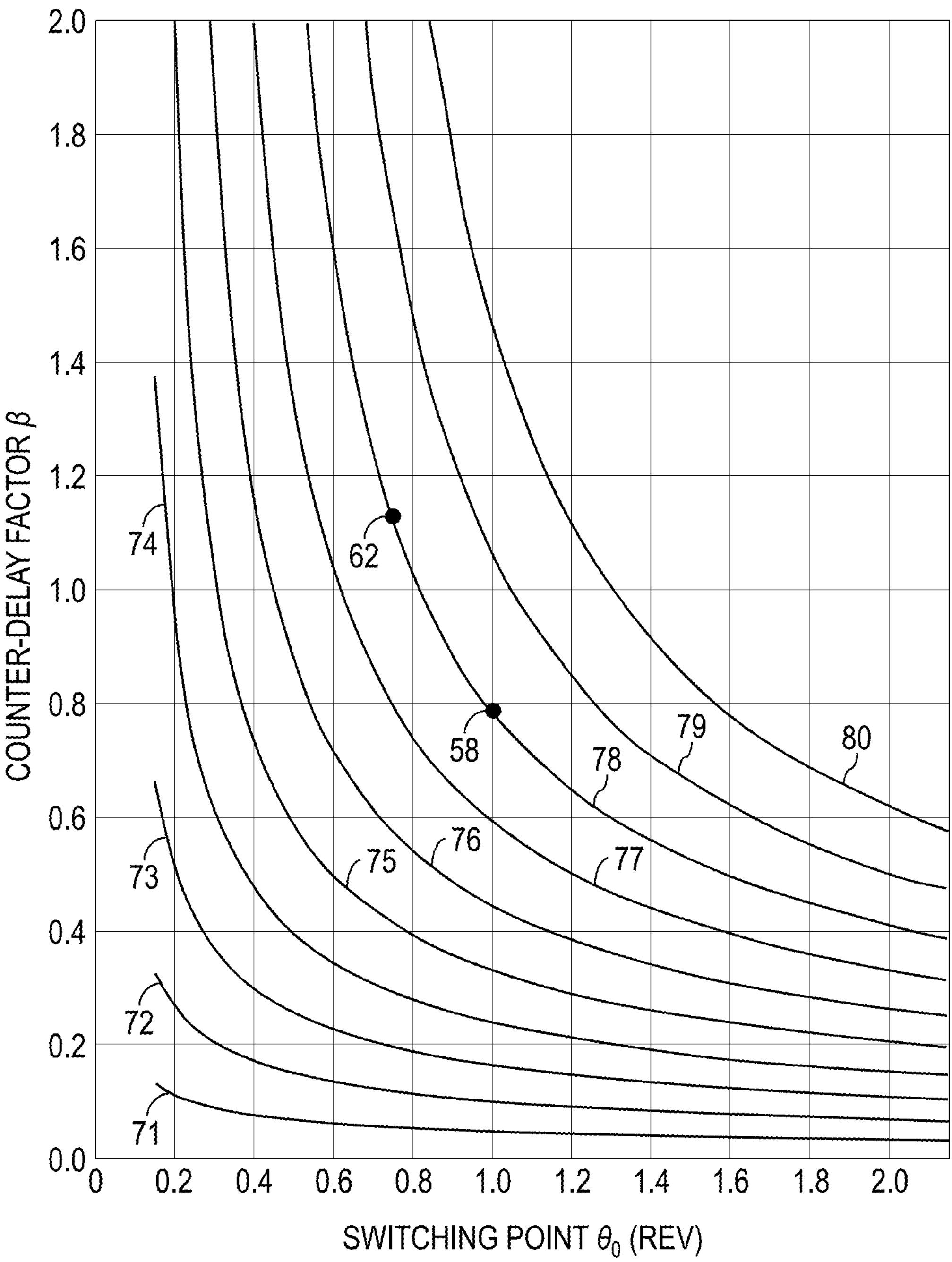
FIG. 6 is a graph depicting one or more aspects of the present disclosure.

To obtain an appropriate value for $\kappa^*$, a discrete finite vector comprising elements having equal intervals can be defined for the switching position $\theta_0$. Similarly, a delay vector may be defined, ranging from 1 ($t_s$), 2, . . . , N, which does not exceed about 200 milliseconds (msec). The values of $\beta$ may then be determined to create N resulting curves that may be utilized similar to a lookup table, such as the example shown in FIG. 6 in which curves 71-80 correspond to N=1, 2, . . . , 10, respectively. The optimal value of $\theta_0$ can then be determined based on a given deceleration rate and N for $\beta<1$. For example, FIG. 6 depicts a data point 58 where $\theta_0$ is 1.0 revolution and $\beta$ is 0.7886, and another data point 62 where $\theta_0$ is 0.75 revolutions and $\beta$ is 1.128, both of which are for delays cycles N=8. Thus, the motor will overshoot more than $|\varepsilon|$ for the case at data point 62, because $\beta>1$, but the overshoot will be less than $|\varepsilon|$ for the case at data point 58 where $\beta<1$.

In practice, the system communication delay may be predetermined, such as from empirical data, actual measurements, and/or other means. For example, in the examples described below in relation to FIGS. 7-15, the delay may be known to be about 160 msec, and the sampling time period $t_s$ may be about 20 msec. Thus, the curve 78 for N=8 (160 msec/20 msec) in FIG. 6 may be utilized to select the switching point $\theta_0$. The switching point $\theta_0$ may be selected as the smallest value of $\theta$ for which $\beta<1$ on the N=8 curve 78, or 0.813 revolutions from the target rotational position. However, the resolution of rotational positioning may not be sufficiently accurate to permit such precision, such as in implementations in which the resolution may be 0.05 revolutions. Accordingly, the selected switching point may be rounded up to the next resolution-permitted increment, or 0.85 revolutions in this example. Moreover, the selected switching point may be enlarged by one or two (or more) additional increments, such as to 0.90 or 0.95 revolutions in this example, to provide additional margin that may account for unknown system delays and/or other factors. However, excessive enlargement of the selected switching point can decrease the speed at which the target rotation position can be reached.

In a motor experiment conducted to confirm the above, a 0.25 horsepower (hp) alternating current (AC) motor with 1,800 rpm of base speed and 0.75 pound-feet (lb-ft) of rated torque was controlled by a dedicated programmable logic controller (PLC) and a variable-frequency drive (VFD). Position measurement was obtained via a 1,024 pulses-per-revolution encoder. The PLC scan time was set to 20 msec and the delay was estimated at about 160 msec. The motor was limited to light loads during the testing. The deceleration rate was set at $-5.0$ rev/s$^2$ (or $-300$ rpm/s). The position control resolution or dead band $\varepsilon$ was set at 0.005 revolutions. The target position that is angular displacement from the initial motor shaft angular position was 20.0 revolutions. FIG. 6, introduced above, shows the corresponding counter delay factor curves based on different delay cycles and a deceleration rate of $-5.0$ rev/s$^2$.

Figure 7:
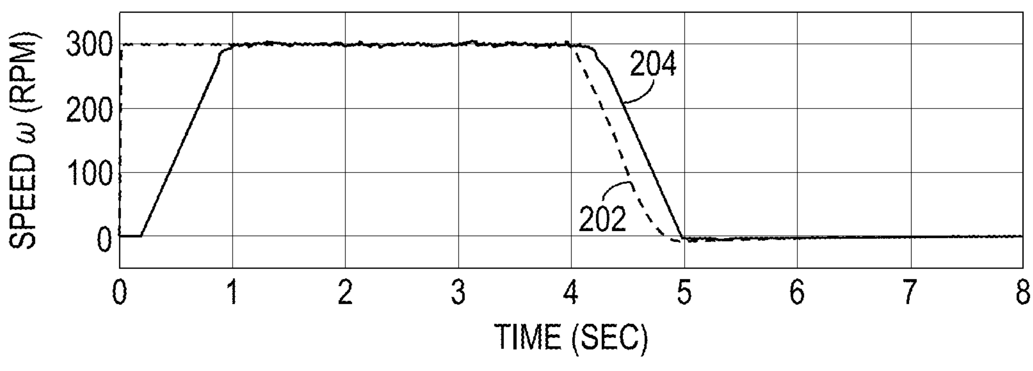
FIGS. 7-18 are graphs depicting an example experimental results according to one or more aspects of the present disclosure.
Figure 8:
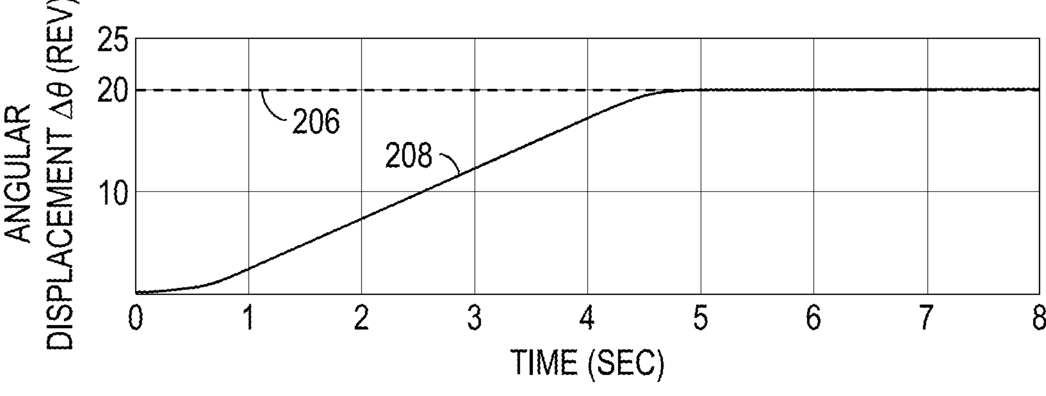
Figure 9:
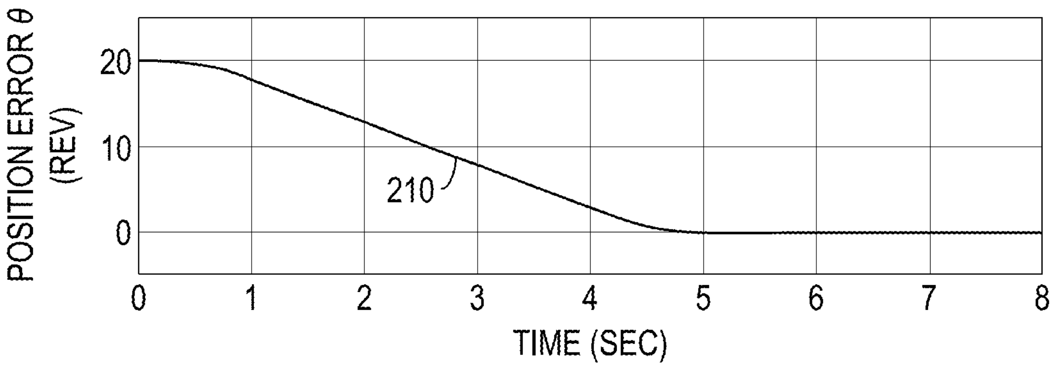
Figure 10:
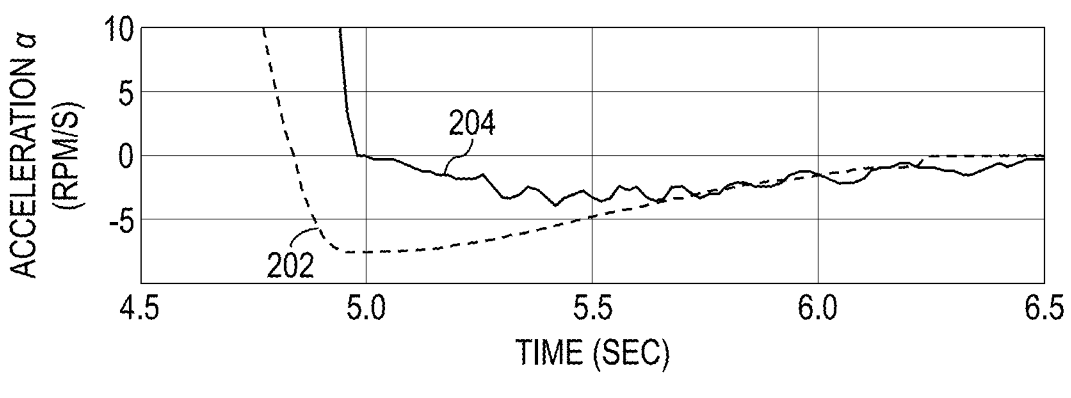
Figure 11:
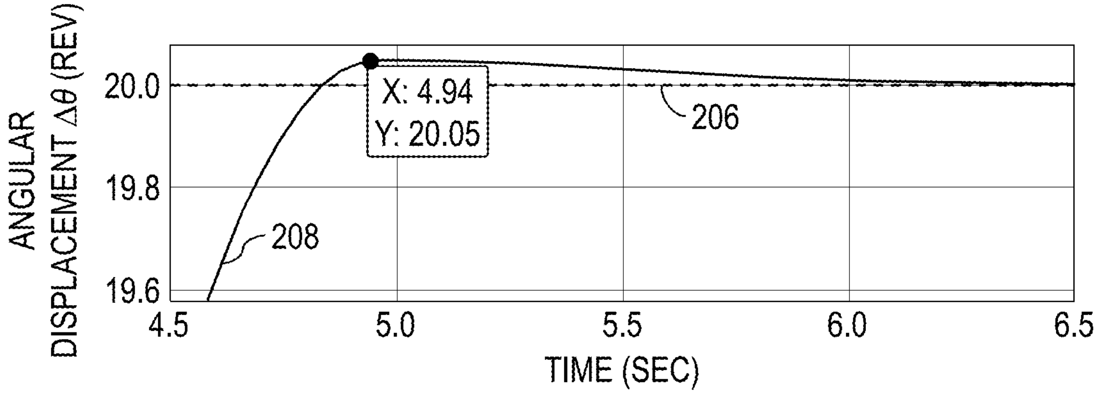
Figure 12:
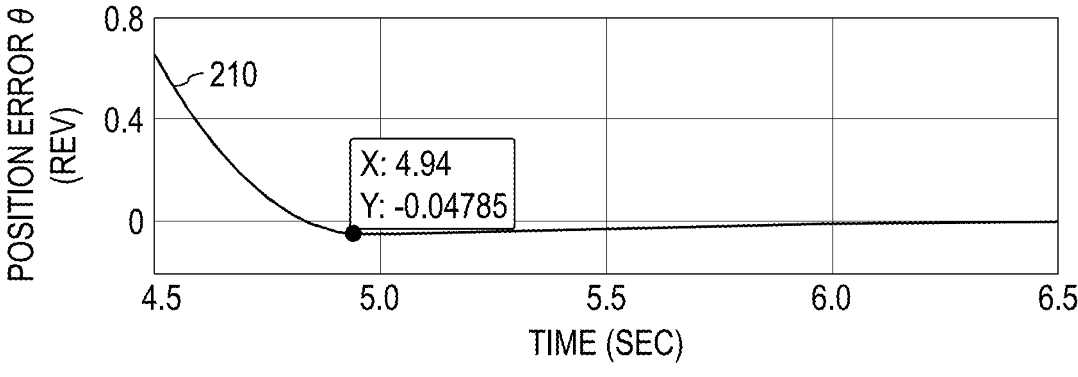
Figure 13:
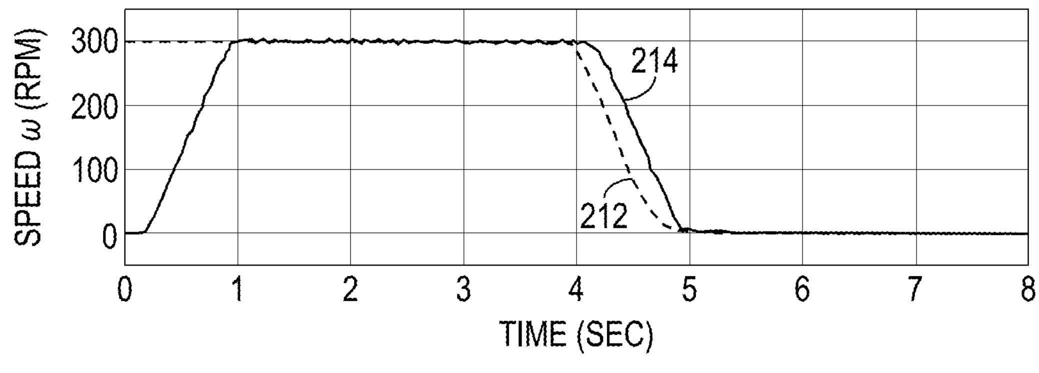
Figure 14:
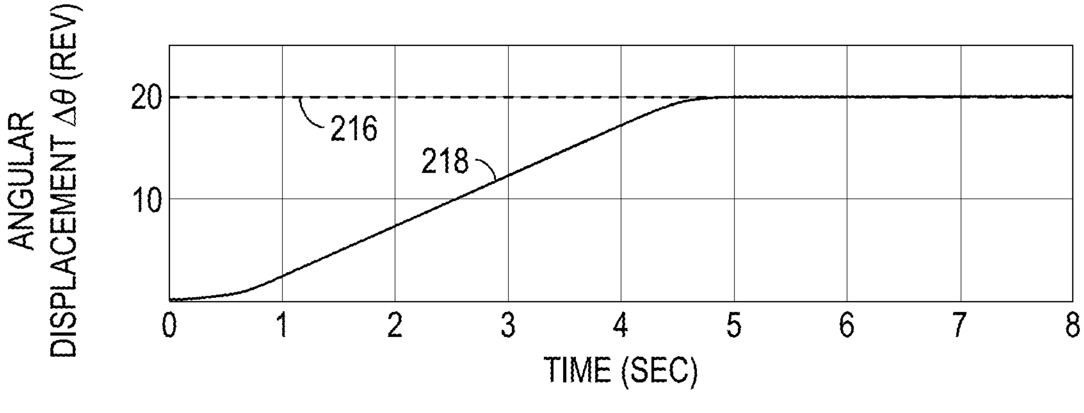
Figure 15:
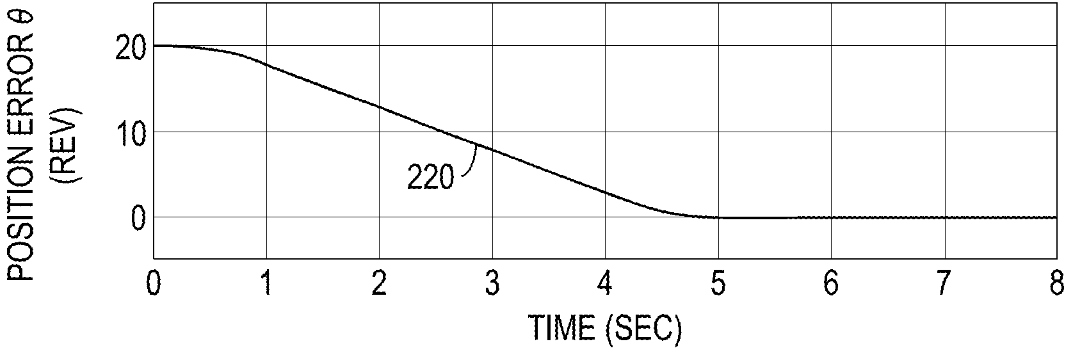
Figure 16:
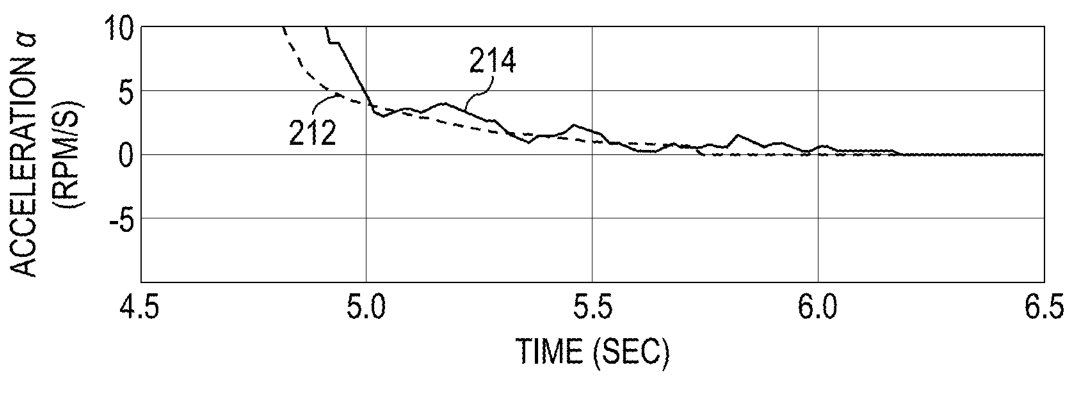
Figure 17:
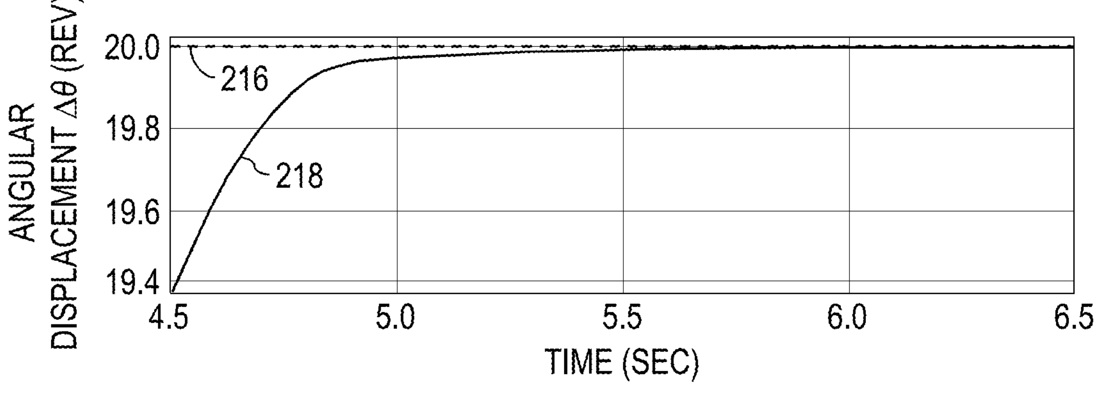
Figure 18:
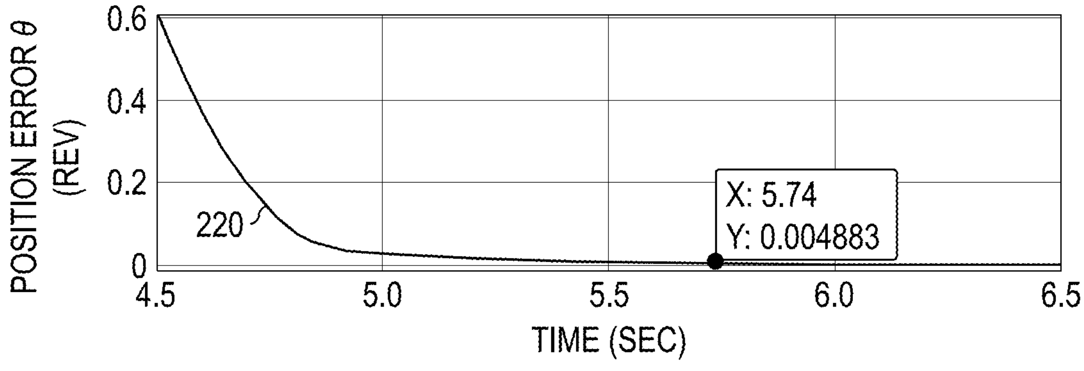

FIG. 7 presents the motor speed $\omega$ Sp 202 and Pv 204, FIG. 8 presents the motor angular displacement $\Delta\theta$ Sp 206 and Pv 208, and FIG. 9 presents the position error $\theta$ Pv 210. FIG. 10 is an enlarged view of a portion of FIG. 7 focused on the time period (4.5-6.5 seconds) when the target was approached and reached. FIGS. 7-12 are for the case of the switching point $\theta_0$ being 0.75 revolutions (corresponding to data point 62 in FIG. 6). FIGS. 13-18 are similar to FIGS. 7-12 but for the case of the switching position being 1.0 revolutions (corresponding to data point 58 in FIG. 6), including the motor speed $\omega$ Sp 212 and Pv 214, the motor angular displacement $\Delta\theta$ Sp 216 and Pv 218, and the position error $\theta$ Pv 220. As shown in FIG. 11, the motor position error $\theta$ Pv 208 overshot the motor position $\theta$ Sp 206 by about 0.05 revolutions. However, as shown in FIG. 17, the motor position error $\theta$ Pv 218 reached the motor position $\theta$ Sp 216 within the desired band and no overshoot. These experimental results demonstrate the motor angular position control scheme introduced herein, as well as the effectiveness of the scheme in determining the switching position.

In implementations utilizing an automatic speed regulator (ASR) for controlling motor speed, high control gains may aid in ensuring that the speed Pv closely tracks the speed Sp. However, the motor load may be large, and often varies. Accordingly, the inertial delay attributable to the motor load may be taken into account as a part of overall system delay, and the reference value where the counter delay factor is just below 1.0 can be used as the lower limit to determine the switching position. Therefore, a value larger than the reference value of the switching point may be utilized.

Figure 19:
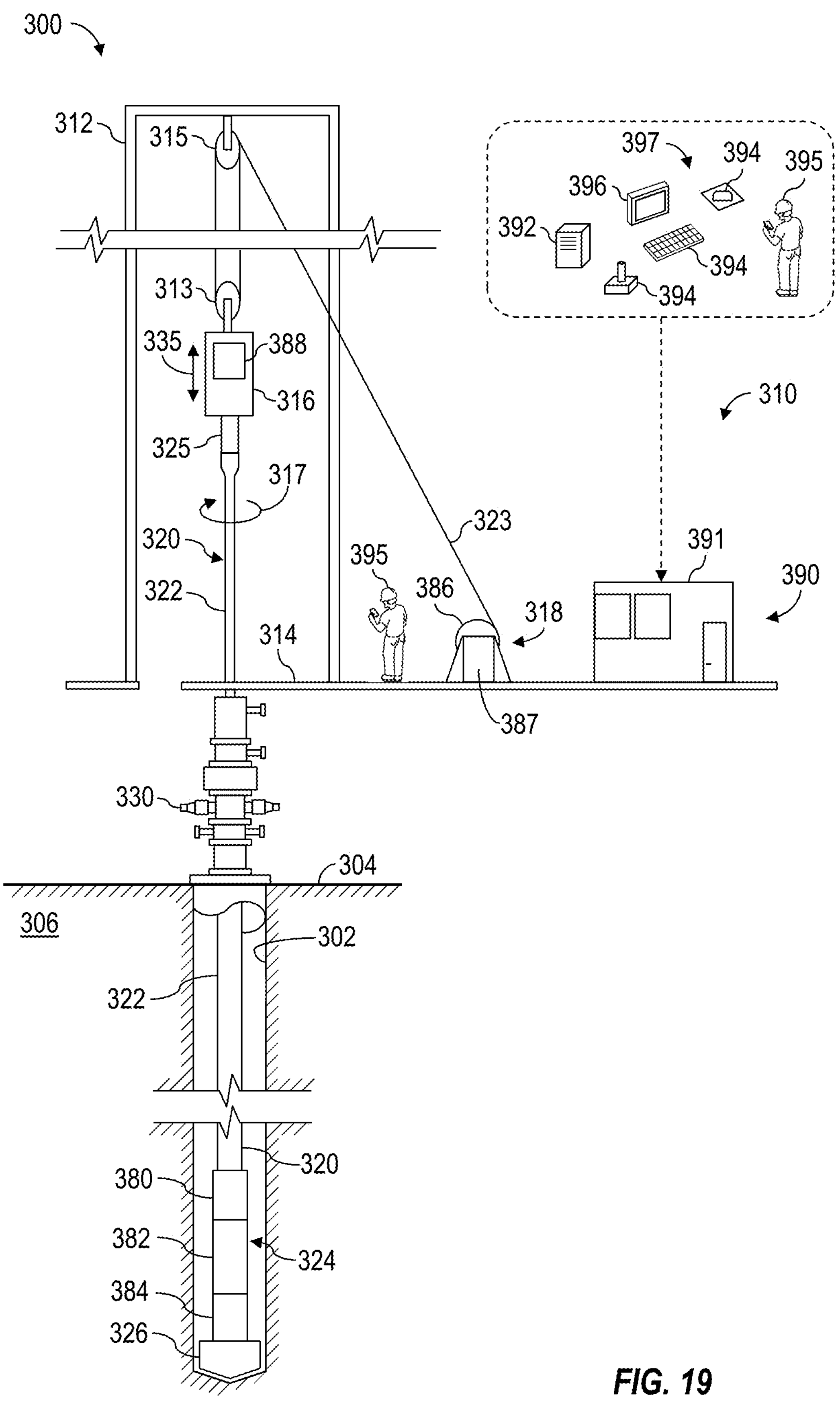
FIG. 19 is a schematic view of at least a portion of an example implementation of well construction apparatus according to one or more aspects of the present disclosure.

FIG. 19 is a schematic view of at least a portion of an example implementation of a well construction system 300 according to one or more aspects of the present disclosure. The well construction system 300 represents an example environment in which one or more aspects of the present disclosure described below may be implemented. The well construction system 300 may be or comprise a well construction rig (i.e., a drilling rig). Although the well construction system 300 is depicted as an onshore implementation, the aspects described below are also applicable to offshore implementations.

The well construction system 300 is depicted in relation to a wellbore 302 formed by rotary and/or directional drilling from a wellsite surface 304 and extending into a subterranean formation 306. The well construction system 300 comprises various well construction equipment (i.e., wellsite equipment), including surface equipment 310 located at the wellsite surface 304 and a drill string 320 suspended within the wellbore 302. The surface equipment 310 may include a mast, a derrick, and/or other support structure 312 disposed over a rig floor 314. The drill string 320 may be suspended within the wellbore 302 from the support structure 312. The support structure 312 and the rig floor 314 are collectively supported over the wellbore 302 by legs and/or other support structures (not shown).

The drill string 320 may comprise a bottom-hole assembly (BHA) 324 and means 322 for conveying the BHA 324 within the wellbore 302. The conveyance means 322 may comprise a plurality of interconnected tubulars, such as drill pipe, heavy-weight drill pipe (HWDP), wired drill pipe (WDP), tough logging condition (TLC) pipe, and drill collars, among other examples. A downhole end of the BHA 324 may include or be coupled to a drill bit 326. Rotation of the drill bit 326 and the weight of the drill string 320 collectively operate to form the wellbore 302. The drill bit 326 may be rotated from the wellsite surface 304 and/or via a downhole mud motor 384 (i.e., drilling fluid motor) connected with the drill bit 326. The BHA 324 may also include various downhole devices and/or tools 380, 382.

The support structure 312 may support a driver, such as a top drive 316, operable to connect (perhaps indirectly) with an upper end of the drill string 320, and to impart rotary motion 317 and vertical motion 335 to the drill string 320, including the drill bit 326. The top drive 316 and the connected drill string 320 may be suspended from the support structure 312 via a hoisting system or equipment, which may include a traveling block 313, a crown block 315, and a drawworks 318 storing a support cable or line 323. The crown block 315 may be connected to or otherwise supported by the support structure 312, and the traveling block 313 may be coupled with the top drive 316. The drawworks 318 may be mounted on or otherwise supported by the rig floor 314. The crown block 315 and traveling block 313 comprise pulleys or sheaves around which the support line 323 is reeved to operatively connect the crown block 315, the traveling block 313, and the drawworks 318. The drawworks 318 may thus selectively impart tension to the support line 323 to lift and lower the top drive 316, resulting in the vertical motion 335. The drawworks 318 comprises a drum 386 and an electric motor 387 operable to drive the drum 386 to rotate and reel in the support line 323, causing the traveling block 313 and the top drive 316 to move upward. The drawworks 318 is also operable to reel out the support line 323 via a controlled rotation of the drum 386, causing the traveling block 313 and the top drive 316 to move downward.

The top drive 316 comprises a drive shaft 325 operatively connected with an electric motor 388, such as via a gear box or transmission (not shown). The drive shaft 325 may be selectively coupled with the upper end of the drill string 320. The electric motor 388 may be selectively operated to rotate the drive shaft 325 and, thus, the drill string 320. Hence, during drilling operations, the top drive 316, in conjunction with operation of the drawworks 318, may advance the drill string 320 into the formation 306 to form the wellbore 302.

The drill string 320 may be conveyed within the wellbore 302 through various fluid control devices disposed at the wellsite surface 304 on top of the wellbore 302 and perhaps below the rig floor 314. The fluid control devices may be operable to control fluid within the wellbore 302. For example, the fluid control devices may include a blowout preventer (BOP) stack 330 for maintaining well pressure control, such as may comprise a series of pressure barriers (e.g., rams).

The surface equipment 310 of the well construction system 300 may also comprise a control center 390 from which various portions of the well construction system 300, such as the top drive 316 and the drawworks 318, among other examples, may be monitored and controlled. The control center 390 may be located on the rig floor 314 or another location of the well construction system 300. The control center 390 may comprise a facility 391 (e.g., a room, a cabin, a trailer, etc.) containing a control workstation 397, which may be operated by rig personnel 395 (e.g., a driller or another human rig operator) to monitor and control various well construction equipment or portions of the well construction system 300. The control workstation 397 may comprise or be communicatively connected with a central controller 392 (e.g., a processing device, a computer, etc.), such as may be operable to receive, process, and output information to monitor operations of and provide control to one or more portions of the well construction system 300. For example, the central controller 392 may be communicatively connected with the top drive 316, the drawworks 318, and/or other surface and/or downhole equipment described herein, and may be operable to receive signals from and transmit signals to such equipment to perform various operations described herein, such as to control the rotational position and speed as described above. The central controller 392 may store executable computer program code, instructions, and/or operational parameters or set-points, including for implementing one or more aspects of methods and operations described herein. The central controller 392 may be located within and/or outside of the facility 391.

The control workstation 397 may be operable for entering or otherwise communicating control data (e.g., commands, signals, information, etc.) to the central controller 392 and other equipment controller by the rig personnel 395, and for displaying or otherwise communicating information from the central controller 392 to the rig personnel 395. The control workstation 397 may comprise a plurality of human-machine interface (HMI) devices, including one or more input devices 394 (e.g., a keyboard, a mouse, a joystick, a touchscreen, etc.) and one or more output devices 396 (e.g., a video monitor, a touchscreen, a printer, audio speakers, etc.). Communication between the central controller 392, the input and output devices 394, 396, and the various well construction equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 19. Additionally, various equipment and/or subsystems of the well construction system 300 shown in FIG. 19 may include more or fewer components than as described above and depicted in FIG. 19. For example, various engines, motors, hydraulics, actuators, valves, and/or other components not explicitly described herein may be included in the well construction system 300, and are within the scope of the present disclosure.

Figure 20:
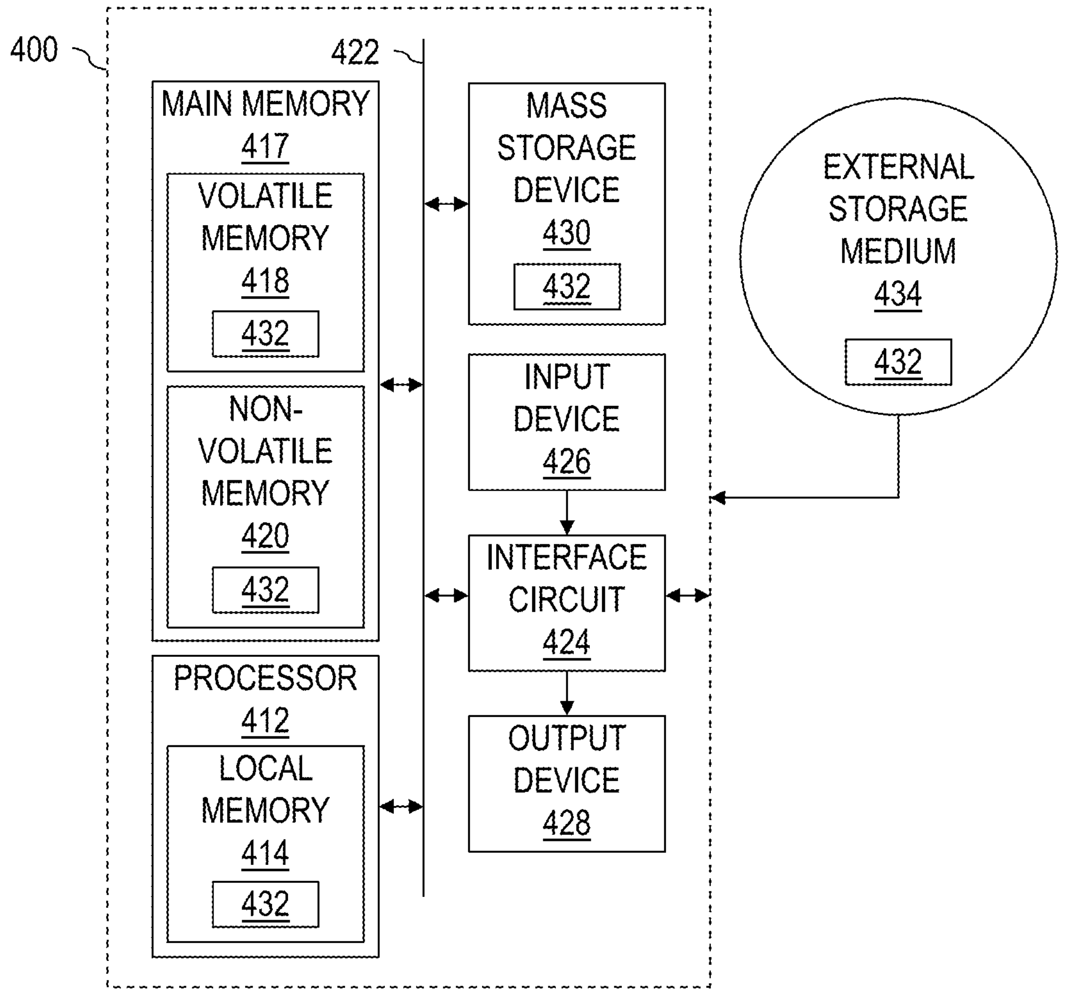
FIG. 20 is a schematic view of at least a portion of an example implementation of processing apparatus according to one or more aspects of the present disclosure.

FIG. 20 is a schematic view of at least a portion of an example implementation of a processing system 400 according to one or more aspects of the present disclosure. The processing system 400 may execute code (for example, machine-readable instructions) to implement at least a portion of one or more of the methods and/or processes described herein. The processing system 400 may be or comprise, for example, one or more processors, controllers, special-purpose computing devices, servers, personal computers, personal digital assistant (PDA) devices, smartphones, internet appliances, and/or other types of computing devices. The entirety of the processing system 400 may be implemented within downhole apparatus described above. One or more components or functions of the processing system 400 may also or instead be implemented in wellsite surface equipment, perhaps including the surface equipment 310, 390, 392 depicted in FIG. 19 and/or other surface equipment.

The processing system 400 may comprise a processor 412, such as a general-purpose programmable processor, among other examples. The processor 412 may comprise a local memory 414 and may execute program code 432 present in the local memory 414 and/or another memory device. The processor 412 may execute code (for example, machine-readable instructions or programs) to implement the methods and/or processes described herein. The code stored in the local memory 414 may include program instructions or computer program code that, when executed by an associated processor, cause a controller and/or control system implemented in surface equipment and/or a downhole tool to perform tasks as described herein. The processor 412 may be, comprise, or be implemented by one or more processors of various types operable in the local application environment, and may include one or more general-purpose processors, special-purpose processors, microprocessors, DSPs, FPGAs, application-specific integrated circuits (ASICs), processors based on a multi-core processor architecture, and/or other processors.

The processor 412 may be in communication with a main memory 417, such as via a bus 422 and/or other communication means. The main memory 417 may comprise a volatile memory 418 and a non-volatile memory 420. The volatile memory 418 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 420 may be, comprise, or be implemented by read-only memory, flash memory, and/or other types of memory devices. One or more memory controllers (not shown) may control access to the volatile memory 418 and/or the non-volatile memory 420.

The processing system 400 may also comprise an interface circuit 424. The interface circuit 424 may be, comprise, or be implemented by various types of standard interfaces, such as an Ethernet interface, a universal serial bus (USB), a third-generation input/output (3GIO) interface, a wireless interface, and/or a cellular interface, among other examples. The interface circuit 424 may also comprise a graphics driver card. The interface circuit 424 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 426 may be connected to the interface circuit 424. One or more of the input devices 426 may permit a user to enter data and/or commands for utilization by the processor 412. Each input device 426 may be, comprise, or be implemented by a keyboard, a mouse, a touchscreen, a trackpad, a trackball, an image/code scanner, and/or a voice recognition system, among other examples.

One or more output devices 428 may also be connected to the interface circuit 424. One or more of the output devices 428 may be, comprise, or be implemented by a display device, such as a liquid crystal display (LCD), a light-emitting diode (LED) display, and/or a cathode ray tube (CRT) display, among other examples. One or more of the output devices 428 may also or instead be, comprise, or be implemented by a printer, a speaker, and/or other examples.

The processing system 400 may also comprise a mass storage device 430 for storing machine-readable instructions and data. The mass storage device 430 may be connected to the interface circuit 424, such as via the bus 422. The mass storage device 430 may be or comprise a floppy disk drive, a hard disk drive, a compact disk (CD) drive, and/or digital versatile disk (DVD) drive, among other examples. The program code 432 may be stored in the mass storage device 430, the volatile memory 418, the non-volatile memory 420, the local memory 414, and/or on a removable storage medium 434, such as a CD or DVD.

The mass storage device 430, the volatile memory 418, the non-volatile memory 420, the local memory 414, and/or the removable storage medium 434 may each be a tangible, non-transitory storage medium. The modules and/or other components of the processing system 400 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising causing operation of a motor controller operable to control rotational speed of an output shaft of an electric motor, wherein: the motor controller comprises a proportional controller and a time-optimal controller; the proportional controller controls the rotational speed when a present rotational position of the shaft is between a target rotational position and a switching point, inclusively; and the time-optimal controller controls the rotational speed when the present rotational position is not between the target rotational position and the switching point.

The proportional controller may control the rotational speed via linear feedback such that the rotational speed may be adjusted in proportion to differences between the target rotational position and the present rotational position.

The time-optimal controller may control the rotational speed based on maximum system-allowed speed and acceleration/deceleration rates.

The proportional and time-optimal controllers may utilize corresponding gain values that are determined based on the switching point and predetermined acceleration and/or deceleration rates. The motor controller may comprise a processor and a memory storing code executable by the processor, and causing the motor controller operation may cause the processor to determine the gain values.

The proportional and time-optimal controllers may utilize corresponding gain values that are determined based on the switching point and predetermined acceleration and/or deceleration rates such that speed commands from the proportional and time-optimal controllers are equal when control is switched between the proportional and time-optimal controllers.

The switching point may be determined via operation of a processor and a memory storing code executable by the processor. The processor may be a first processor, the memory may be a first memory, and the code may be first code; the motor controller may comprise a second processor and a second memory storing second code executable by the second processor, in which case the motor controller may not comprise the first processor or the first memory; and causing the motor controller operation may include inputting the switching point determined by the first processor. In such implementations, among others within the scope of the present disclosure, the switching point may be predetermined prior to commencement of the method. Alternatively, the motor controller may comprise the processor and memory, and causing the motor controller operation may cause the processor to determine the switching point.

Operation of the processor may determine the switching point in a manner that minimizes overshooting the target rotational position while maximizing expediency at which the target rotational position is reached.

Operation of the processor may determine the switching point in a manner that accounts for system communication delays.

Operation of the processor may determine the switching point by: determining which one of N curves corresponds to a predetermined system communications delay, wherein N is a positive integer, and wherein each of the N curves relates a counter delay factor $\beta$ to candidate switching points; and selecting the switching point as a smallest one of the candidate switching points that results in a value of the counter delay factor being less than one for the determined one of the N curves.

Operation of the processor may determine the switching point by: determining which one of N curves corresponds to a predetermined system communications delay, wherein N is a positive integer, and wherein each of the N curves relates a counter delay factor $\beta$ to candidate switching points;

determining a smallest one of the candidate switching points that results in a value of the counter delay factor being less than one; and selecting the switching point as a rotational position that is larger than the determined smallest one of the candidate switching points. The selected switching point may be a result of rounding up the determined smallest one of the candidate switching points to a multiple of a rotational positioning precision of the shaft. The selected switching point may be greater than the determined smallest one of the candidate switching points by an amount that includes a margin to account for unknown factors.

The present disclosure also introduces a method comprising determining a switching point to be used by a motor controller that is operable to control rotational speed of an output shaft of an electric motor, wherein: (A) the motor controller comprises a proportional controller and a time-optimal controller; (B) the proportional controller controls the rotational speed when a present rotational position of the shaft is between a target rotational position and the switching point, inclusively; (C) the time-optimal controller controls the rotational speed when the present rotational position is not between the target rotational position and the switching point; and (D) determining the switching point comprises: (i) determining which one of N curves corresponds to a predetermined system communications delay, wherein N is a positive integer, and wherein each of the N curves relates a counter delay factor $\beta$ to candidate switching points; and (ii) selecting the switching point based on a smallest one of the candidate switching points that results in a value of the counter delay factor being less than one for the determined one of the N curves.

Selecting the switching point may comprise: determining the smallest one of the candidate switching points that results in a value of the counter delay factor being less than one; and selecting the switching point as a rotational position that is larger than the determined smallest one of the candidate switching points. The selected switching point may be a result of rounding up the determined smallest one of the candidate switching points to a multiple of a rotational positioning precision of the shaft. The selected switching point may be greater than the determined smallest one of the candidate switching points by an amount that includes a margin to account for unknown factors.

The present disclosure also introduces an apparatus comprising an electric motor that comprises an output shaft and a motor controller operable to control rotational speed of the output shaft, wherein the motor controller comprises: a proportional controller that controls the rotational speed when a present rotational position of the shaft is between a target rotational position and a switching point, inclusively; and a time-optimal controller that controls the rotational speed when the present rotational position is not between the target rotational position and the switching point.

The proportional controller may control the rotational speed via linear feedback such that the rotational speed is adjusted in proportion to differences between the target rotational position and the present rotational position.

The time-optimal controller may control the rotational speed based on maximum system-allowed speed and acceleration/deceleration rates.

The proportional and time-optimal controllers may utilize corresponding gain values that are determined based on the switching point and predetermined acceleration and/or deceleration rates. The motor controller may comprise a processor and a memory storing code executable by the processor, and causing the motor controller operation may cause the processor to determine the gain values.

The proportional and time-optimal controllers may utilize corresponding gain values that are determined based on the switching point and predetermined acceleration and/or deceleration rates such that speed commands from the proportional and time-optimal controllers are equal when control is switched between the proportional and time-optimal controllers.

The switching point may be determined via operation of a processor and a memory storing code executable by the processor. The processor may be a first processor, the memory may be a first memory, and the code may be first code; the motor controller may comprise a second processor and a second memory storing second code executable by the second processor, and the motor controller may not comprise the first processor or the first memory; and causing the motor controller operation may include inputting the switching point determined by the first processor. Alternatively, the motor controller may comprise the processor and memory, and causing the motor controller operation may cause the processor to determine the switching point.

The present disclosure also introduces an apparatus comprising a processing system that comprises a processor and a memory storing code executable by the processor to determine a switching point to be used by a motor controller that is operable to control rotational speed of an output shaft of an electric motor, wherein: (A) the motor controller comprises a proportional controller and a time-optimal controller; (B) the proportional controller controls the rotational speed when a present rotational position of the shaft is between a target rotational position and the switching point, inclusively; (C) the time-optimal controller controls the rotational speed when the present rotational position is not between the target rotational position and the switching point; and (D) the processing system determines the switching point by: (i) determining which one of N curves corresponds to a predetermined system communications delay, wherein N is a positive integer, and wherein each of the N curves relates a counter delay factor $\beta$ to candidate switching points; and (ii) selecting the switching point based on a smallest one of the candidate switching points that results in a value of the counter delay factor being less than one for the determined one of the N curves.

Selecting the switching point may comprise: determining the smallest one of the candidate switching points that results in a value of the counter delay factor being less than one; and selecting the switching point as a rotational position that is larger than the determined smallest one of the candidate switching points. The selected switching point may be a result of rounding up the determined smallest one of the candidate switching points to a multiple of a rotational positioning precision of the shaft. The selected switching point may be greater than the determined smallest one of the candidate switching points by an amount that includes a margin to account for unknown factors.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72 (b) to permit the reader to quickly ascertain the nature of the technical disclosure. It is submitted with the understanding that it will not be used to interpret or limit the scope or meaning of the claims.

What is claimed is:

1. A method comprising:

determining a switching point to be used by a motor controller that is operable to control rotational speed of an output shaft of an electric motor, wherein:

the motor controller comprises: a processor; a memory storing code executable by the processor; a proportional controller; and a time-optimal controller;

the proportional controller controls the rotational speed when a present rotational position of the shaft is between a target rotational position and the switching point, inclusively;

the time-optimal controller controls the rotational speed when the present rotational position is not between the target rotational position and the switching point, wherein the switching point is determined via operation of the processor and the memory, and wherein the operation of the processor determines the switching point by:

determining which one of N curves corresponds to a predetermined system communications delay, wherein N is a positive integer, and wherein each of the N curves relates a counter delay factor β to candidate switching points; and selecting the switching point based on a smallest one of the candidate switching points that results in a value of the counter delay factor being less than one for the determined one of the N curves.

2. The method of claim 1, wherein selecting the switching point comprises:

determining the smallest one of the candidate switching points that results in a value of the counter delay factor being less than one; and selecting the switching point as a rotational position that is larger than the determined smallest one of the candidate switching points.

3. The method of claim 2, wherein the selected switching point is a result of rounding up the determined smallest one of the candidate switching points to a multiple of a rotational positioning precision of the shaft.

4. The method of claim 2, wherein the selected switching point is greater than the determined smallest one of the candidate switching points by an amount that includes a margin to account for unknown factors.

5. The method of claim 1, wherein the proportional controller controls the rotational speed via linear feedback such that the rotational speed is adjusted in proportion to differences between the target rotational position and the present rotational position.

6. The method of claim 1, wherein the time-optimal controller controls the rotational speed based on maximum system-allowed speed and acceleration/deceleration rates.

7. The method of claim 1, wherein the proportional and time-optimal controllers utilize corresponding gain values that are determined based on the switching point and predetermined acceleration and/or deceleration rates.

8. The method of claim 7, wherein the processor determines the gain values.

9. The method of claim 1, wherein the proportional and time-optimal controllers utilize corresponding gain values that are determined based on the switching point and predetermined acceleration and/or deceleration rates such that speed commands from the proportional and time-optimal controllers are equal when control is switched between the proportional and time-optimal controllers.

10. The method of claim 1, wherein operation of the processor determines the switching point in a manner that minimizes overshooting the target rotational position while maximizing expediency at which the target rotational position is reached.

11. The method of claim 1, wherein operation of the processor determines the switching point in a manner that accounts for system communication delays.

* * * * *